United States Patent
Carrion et al.

(10) Patent No.: US 10,336,566 B2
(45) Date of Patent: Jul. 2, 2019

(54) FEED TAPE DISPENSER

(71) Applicant: Shurtech Brands, LLC., Avon, OH (US)

(72) Inventors: Heidi Carrion, Avon, OH (US); Aaron Misener, Lakewood, OH (US)

(73) Assignee: Shurtech Brands, LLC, Avon, OH (US)

( * ) Notice: Subject to any disclaimer, the term of this patent is extended or adjusted under 35 U.S.C. 154(b) by 0 days.

(21) Appl. No.: 15/843,572

(22) Filed: Dec. 15, 2017

(65) Prior Publication Data
US 2019/0092597 A1 Mar. 28, 2019

Related U.S. Application Data

(63) Continuation-in-part of application No. 29/619,341, filed on Sep. 28, 2017.

(51) Int. Cl.
*B65H 35/00* (2006.01)
*B32B 43/00* (2006.01)

(52) U.S. Cl.
CPC ....... *B65H 35/0026* (2013.01); *B32B 43/006* (2013.01); *B65H 35/0033* (2013.01)

(58) Field of Classification Search
CPC ..................... B65H 35/006; B65H 35/0033
USPC ............................................. D19/69
See application file for complete search history.

(56) References Cited

U.S. PATENT DOCUMENTS

| | | | |
|---|---|---|---|
| 5,468,332 A | 11/1995 | Dretzka et al. | |
| 5,820,005 A | 10/1998 | Perkitny et al. | |
| 5,921,450 A * | 7/1999 | Robinson | B65H 35/0026 156/579 |
| D502,508 S * | 3/2005 | Hung | D19/67 |
| 6,874,554 B2 * | 4/2005 | Chandaria | B65H 35/0033 156/527 |
| 7,093,640 B2 | 8/2006 | Chandaria | |
| 7,334,620 B2 * | 2/2008 | Imazeki | B65H 35/0033 156/227 |
| 7,357,285 B2 * | 4/2008 | Namekawa | B65H 35/0033 156/463 |
| 8,191,597 B2 | 6/2012 | Vulpitta | |
| 2002/0079346 A1* | 6/2002 | Yu | B65H 35/0026 225/57 |
| 2016/0355366 A1* | 12/2016 | Tiedemann | B65H 35/0026 |

* cited by examiner

*Primary Examiner* — Mark A Osele
(74) *Attorney, Agent, or Firm* — Fay Sharpe LLP

(57) ABSTRACT

A tape dispenser with a frame having top wall and opposed side walls. The top wall connects the opposed side walls. A tape mount is disposed on an interior surface of each of the side walls and is adapted to secure a roll of tape therebetween. A roll of adhesive tape is secured on the tape mount. A cutter blade is disposed on a forward region of the frame and is adapted to cut tape from the roll. A bar is disposed on an interior surface of one side wall and extends between greater than about 30% and less than about 90% of a distance between the opposed side walls. The bar has an upper surface receiving an adhesive side of the tape. A pressure pad is mounted on the frame adjacent the cutter blade.

16 Claims, 5 Drawing Sheets

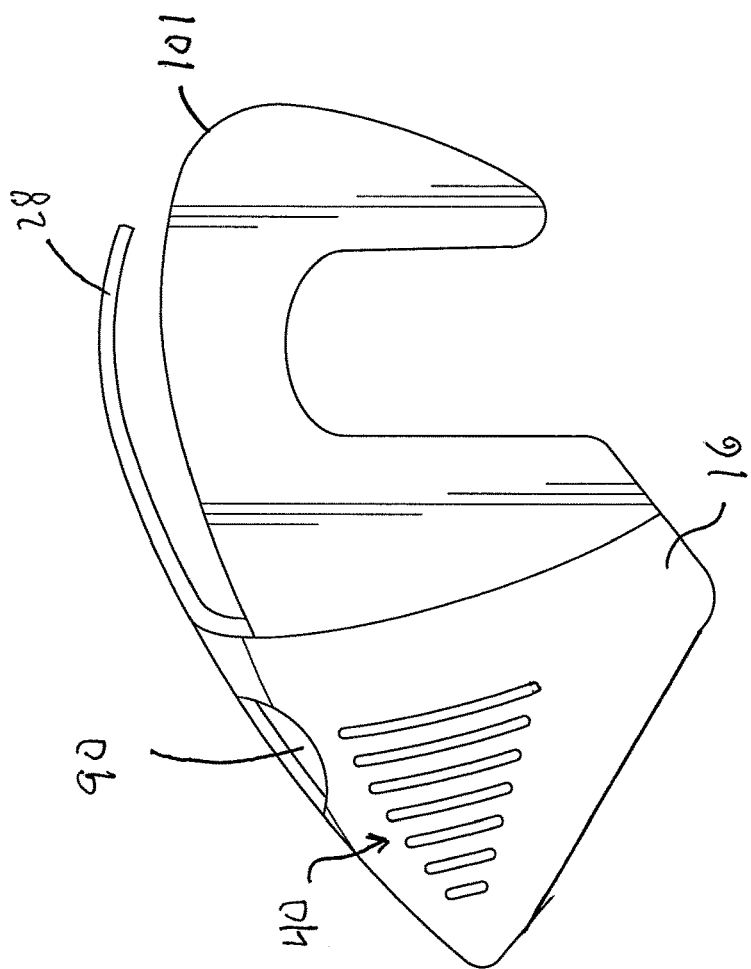
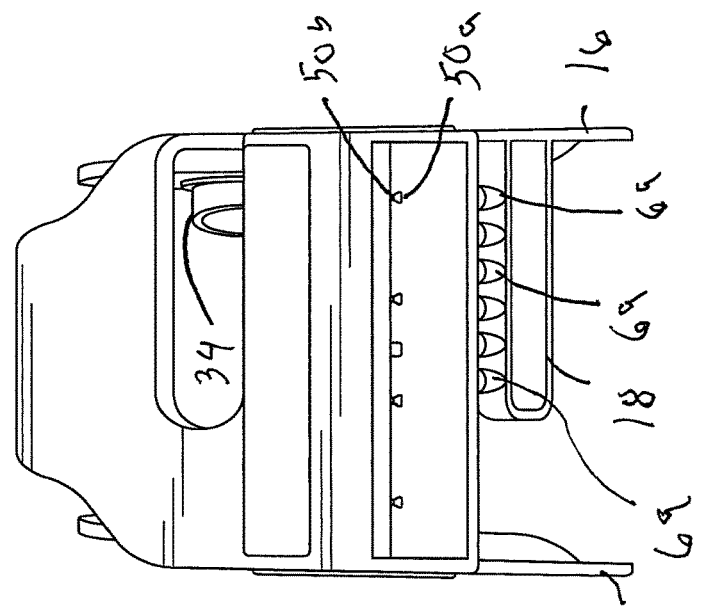
FIG. 4
FIG. 5

FEED TAPE DISPENSER

This application is a continuation-in-part of U.S. Design application Ser. No. 29/619,341, filed Sep. 28, 2017.

BACKGROUND

The present exemplary embodiment relates to a hand held adhesive tape dispenser. It finds particular application in conjunction with packaging style tapes and will be described with particular reference thereto. However, it is to be appreciated that the present exemplary embodiment is also amenable to other similar applications.

Adhesive tape is used for many purposes by consumers and businesses. One type of adhesive tape is sometimes called packaging tape. Packaging tape is frequently sold as rolls of tape which can be a fraction of an inch to several inches wide. It comes in various lengths from a few yards to 100 yards and beyond. The tape normally consists of a plastic film with an adhesive on one side. The adhesive tape is wound upon a cylindrical core, which is often made from either a cardboard or a plastic material. Some tapes include filaments to reinforce the tape. "Packaging tape" is used herein to mean adhesive tape having a plastic film of substantially uniform width with adhesive on one side rolled in many turns upon a core.

Consumers and businesses often use packaging tape to seal boxes. A length of the tape is removed from the roll and applied to the flaps of the box to close the box. Packaging tapes are often applied using a dispenser. Rolls of packaging tape are often sold on a dispenser. To be attractive to consumers, a dispenser for packaging tape should be easy to use, apply tape to a substrate reliably, cut tape from the roll of tape after application of tape, and be inexpensive. Reusability of a tape dispenser is also a positive attribute.

Dispenser shortcomings can include difficulty in installing a replacement roll of tape and a dispenser that does not adequately keep a free end of the tape accessible for application to a substrate. The present disclosure describes a dispenser that overcomes these shortcomings.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a tape dispenser with a frame having a top wall and opposed side walls is provided. The top wall connects the opposed side walls. A tape mount is disposed on an interior surface of each of the side walls and is adapted to secure a roll of tape therebetween. A roll of adhesive tape is secured on the tape mount. A cutter blade is disposed on a forward region of the frame and is adapted to cut tape from the roll. A bar is disposed on an interior surface of one side wall and extends between greater than about 40% and less than about 90% of a distance between the opposed side walls. The bar has an upper surface receiving an adhesive side of the tape. A pressure pad is mounted on the frame adjacent the cutter blade. The pressure pad has a bottom surface adapted to push tape from the roll into contact with a surface to which the tape is being applied.

According to a second embodiment, a method of installing a roll of adhesive tape on a dispenser is provided. The method comprises providing a tape dispenser including a frame having a top wall and opposed side walls, the top wall connecting the opposed side walls. A tape mount is disposed on an interior surface of each of the side walls and is adapted to secure a roll of tape therebetween. A bar is disposed on the interior surface of one side wall. The bar extends between greater than about 40% and less than about 90% of a distance between the opposed side walls. The bar includes an upper surface positioned to receive an adhesive side of the tape. A core of the roll of adhesive tape is placed on the tape mount and a length of tape is dispatched from the roll. The dispatched length of tape is twisted and passed through the space formed between an end of the bar and the cooperative side wall. The length of tape is then oriented parallel to a longitudinal axis of the bar, an adhesive surface of the tape is rested upon the bar.

BRIEF DESCRIPTION OF THE DRAWINGS

FIG. 4 is the other side plan view thereof;
FIG. 5 is a front side plan view thereof.

DETAILED DESCRIPTION

The tape dispenser according to the present disclosure can comprise a frame that includes (1) a cutter support portion having a cutting edge adapted to transversely cut the tape, (2) opposite side wall portions attached along opposite side edges of the cutter support portion that are disposed generally at right angles to the cutter support portion and to the cutting edge, (3) at least one hub portion projecting from one of the side wall portions, the hub portion having a peripheral surface adapted to support the cylindrical inner surface of a tape roll core for rotation about an axis generally parallel to the tape cutting edge, and (4) at least one bar element projecting from the side wall providing a tape support surface between the hub portion and the cutter portion to which newly cut end portions of the tape may be releasably adhered in a projecting position to afford withdrawing a length of tape from the roll.

Figure 1:
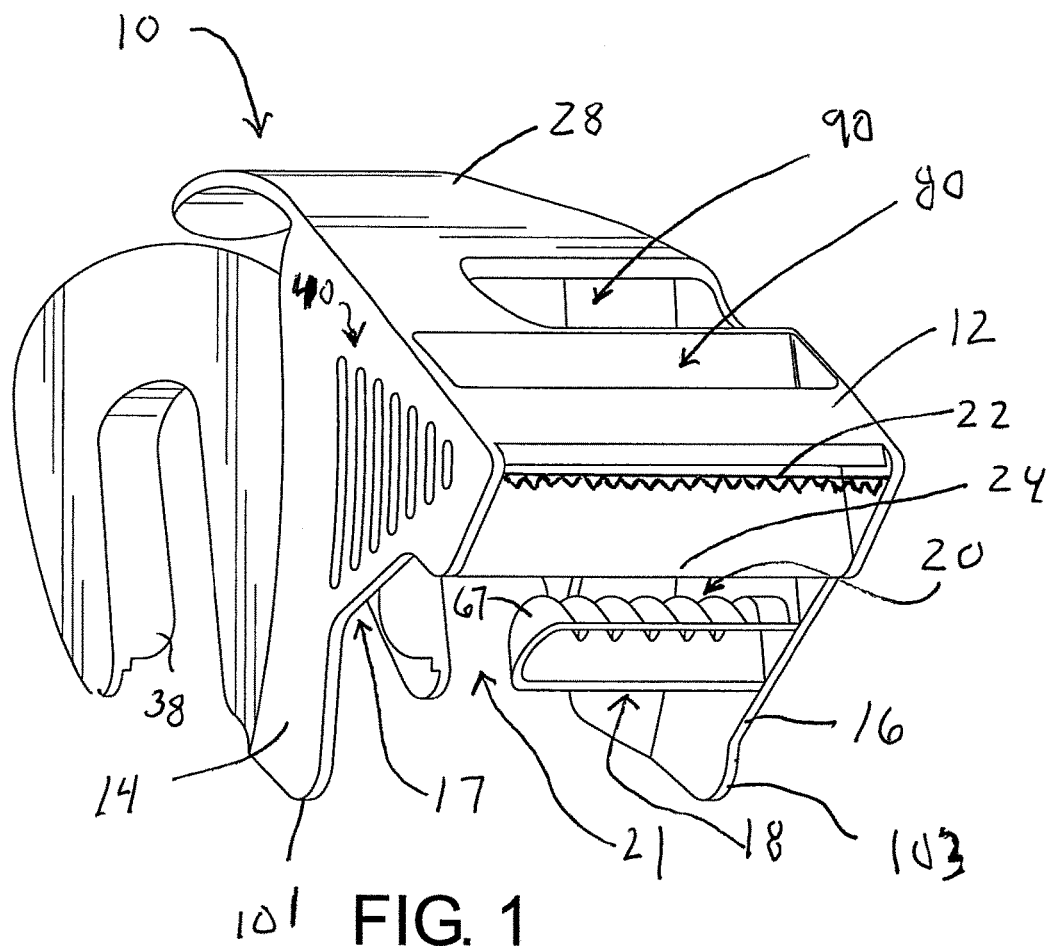
FIG. 1 is a perspective view of a tape dispenser.
Figure 2:
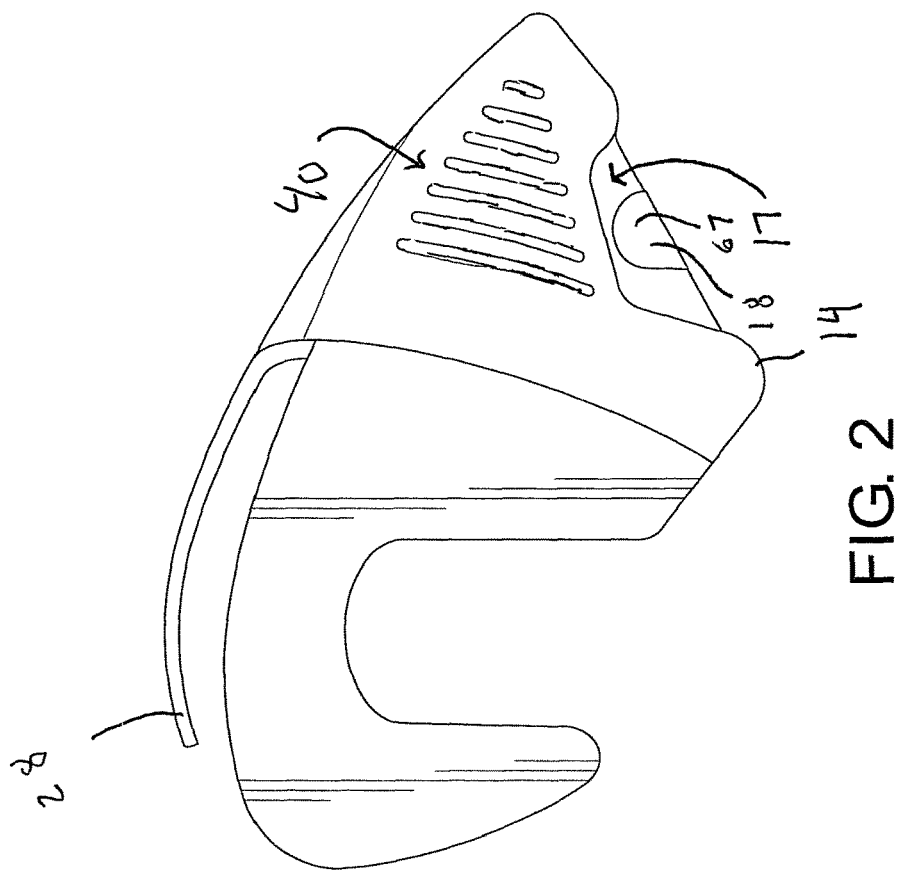
FIG. 2 is a first side plan view thereof.
Figure 3:
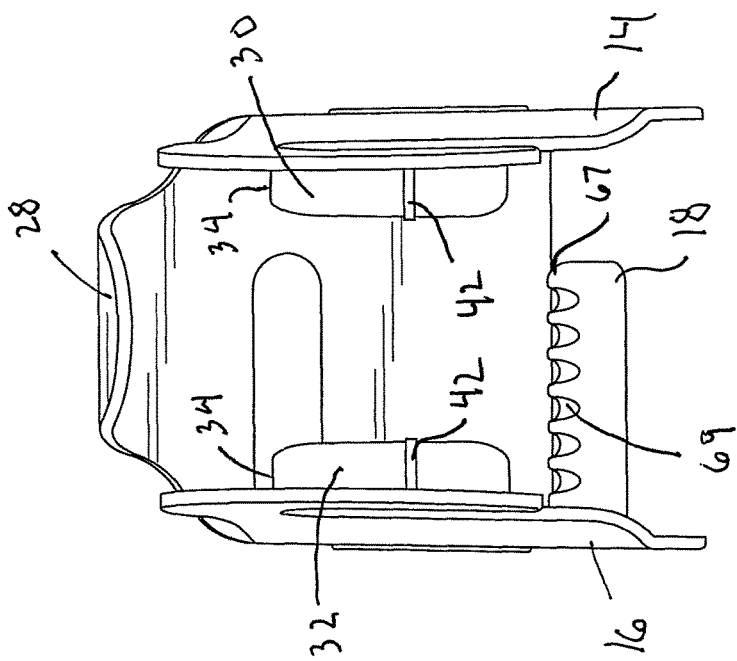
FIG. 3 is a rear plan view thereof.
Figure 6:
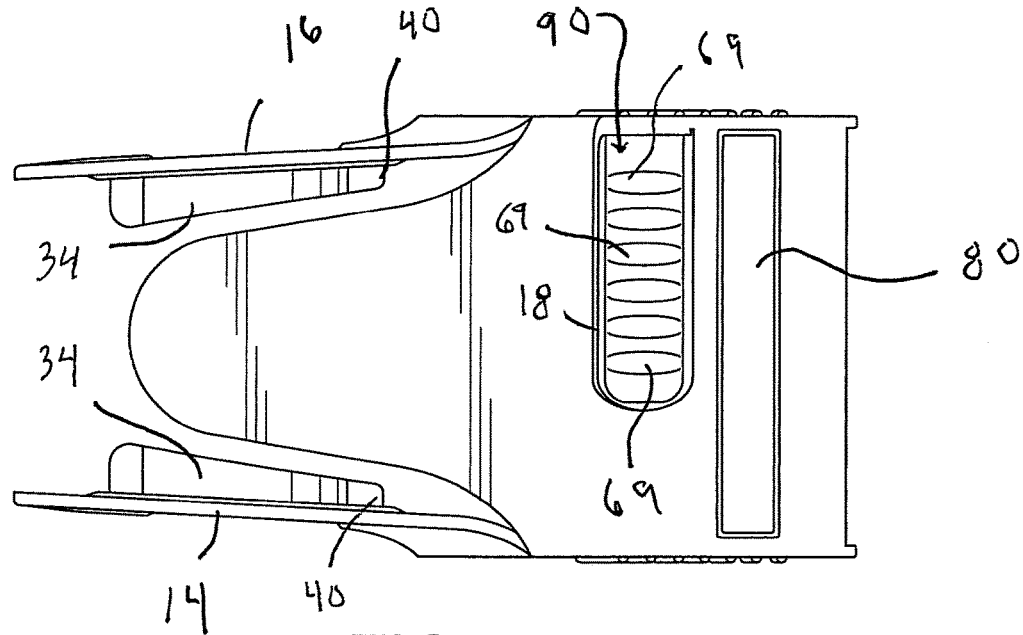
FIG. 6 is a top end view thereof.
Figure 7:
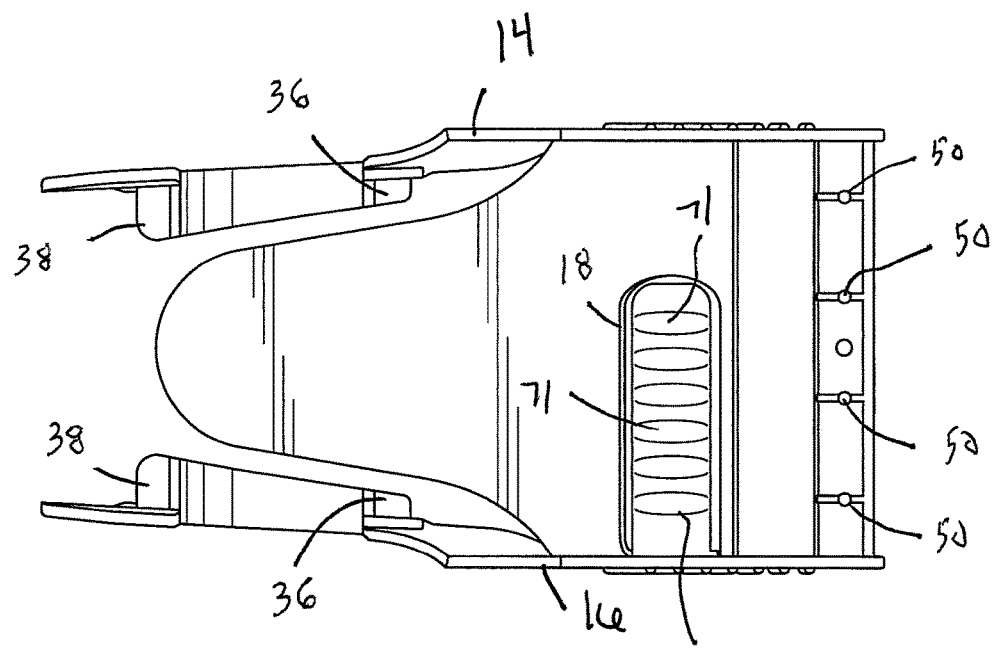
FIG. 7 is a bottom end view thereof.
Figure 8:
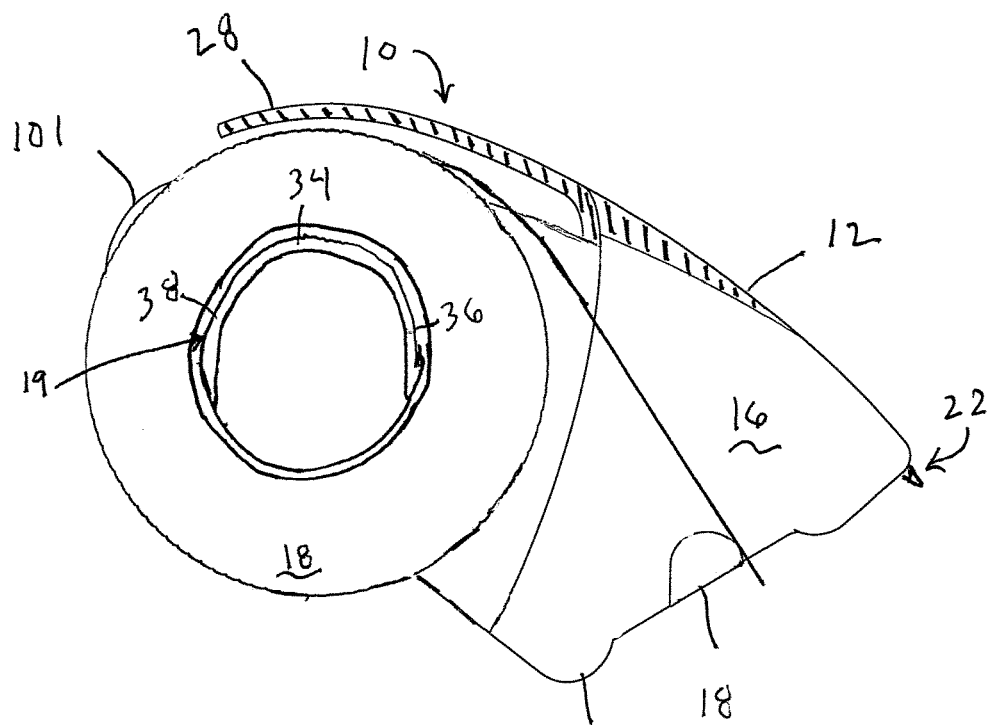
FIG. 8 is a cross-section view including a roll of adhesive tape mounted to the tape dispenser.
Figure 9:
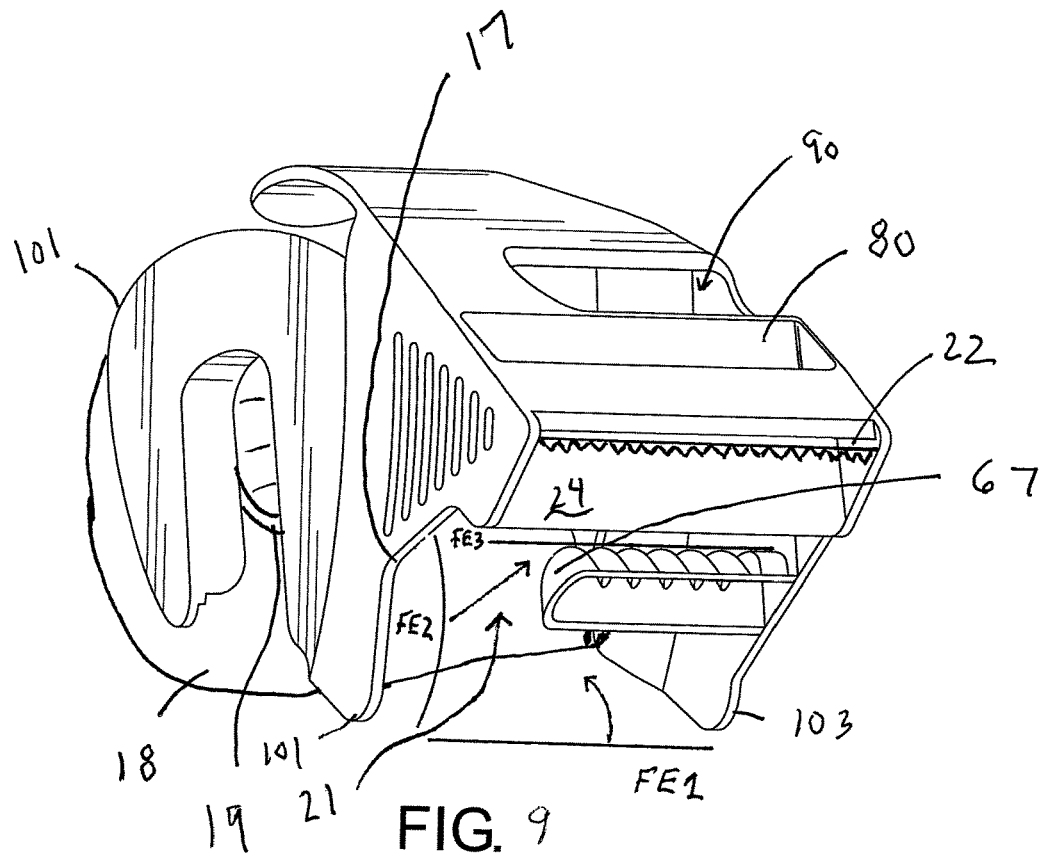
FIG. 9 is a perspective view of tape installation orientations.

Referring now to the Figures wherein the showings are for the purposes of illustrating one embodiment and not for the purposes of limiting same, the Figures show a tape dispenser 10 holding a roll of tape 18 such as a pressure sensitive adhesive-coated tape wound upon a cardboard cylindrical core 19 (see FIGS. 8 and 9).

Such rolls of tape come in various sizes. Rolls of tape often have inside core diameters of a nominal one and one-half inches or a nominal three inches. Rolls of tape come in various widths, such as 1", 1.5" and 2". However, other core and width sizes are suitable for use in association with the subject tape dispenser.

The dispenser 10 is comprised of a top wall 12 interconnecting two side walls 14, 16. The exterior walls including top wall 12 and side walls 14, 16 can generally be mirror images of one another and the dispenser as a whole is generally symmetrical with the right side being a mirror image of the left side with the exception of a side notch 17 being formed in side wall 14.

A central crosspiece extension 28 extends rearwardly, that is, towards the position of the roll of tape, from the top wall 12. This extension 28 provides a convenient place to hold the dispenser during tape dispensing operation.

Two hubs 30, 32 are supported on the side walls 14, 16. The hubs 30, 32 can be mirror images of one another. The hubs can be comprised of an arcuate top portion 34, a forward hub side portion 36, a rearward hub side portion 38, a forward horizontal rib 40 and a rearward horizontal rib 42. The hubs provide a bearing surface against which the edge of a tape core may slide. The hub top portion 34 can have a uniform radius of curvature over most of its length. The uniform radius of curvature can be somewhat smaller than the radius of curvature of the tape core 19. The top portion 34 therefore provides a good support surface for the tape core 19.

A cutter blade 22 and a pressure pad 24 are provided proximate the front portion of upper surface 12. The cutter blade 22 is normally formed by a serrated blade attached to the top wall 12. Cutter blade 22 can be manufactured from metal. Cutter blade 22 could also be molded from a polymeric material. Cutter blade 22 can be connected to dispenser 10 by a plurality of pins 50. The diameter of ends 50a of pins 50 may be somewhat larger than the shafts 50b and of slightly greater diameter than apertures in the cutter blade. This allows the upper ends 50a of pins 50 to be received through apertures to securely hold cutter blade 22, but at the same time substantially prevent withdrawal of the pins 50 from the apertures without the application of some force.

The pressure pad 24 is spaced slightly below the cutter blade 22. When a piece of tape is fed through the front end of the dispenser the pressure pad 24 can be used to apply the tape to a surface and to exert tension on the tape allowing cutter blade 22 to separate the applied length of the tape.

A tape guide portion includes a bar 18 extending partially between the two side walls 14 and 16. A space 21 is created between the end 67 of the bar 18 and side wall 14. Bar 18 can extend between greater than 40% and less than 90% of the distance. Extending between greater than 50% and less than 75% of the distance is also acceptable. In this regard, it is noted that the present design is advantageous relative to prior art designs such as shown in U.S. Pat. No. 8,191,597, wherein guiding tabs are provided on the opposed side walls. Particularly, the support bar of the present disclosure provides a significantly larger tape supporting surface area which can reduce roll back yet provide easier tape loading from a bottom side of the dispenser via space Space 21 can allow a length of tape to be dispensed from the roll and manipulated into a position resting on an upper surface 20 of bar 18. Surface 20 is adapted to support the tape as it is being dispensed and support a free end of the tape when the dispenser 10 is not in use.

Bar 18 can be a cylinder or a semi-cylinder as shown. Of course, bar 18 can comprise a variety of other shapes. An interior surface of the bar may include projections 71 to increase strength and rigidity. End 67 of the bar 18 may include a rounded surface to facilitate sliding of the tape thereover during installation. Upper surface 20 can also be rounded to minimize surface contact with the adhesive side of the tape. Similarly, upper surface 20 can be crenulated (see indentations 69) to further reduce surface area contact. As an alternative, a roller element may form a portion or all of bar 18.

Dispenser 10 can be molded from a suitable polymeric material that allows it to be manufactured reasonably cheaply but also be relatively strong and sturdy. Preferably, dispenser 10 is molded as an integral unit and side walls 14, 16 and extension 28 are able to flex somewhat relative to each other so as to allow the roll of tape 18 to be inserted into dispenser 10.

A series of corrugations 40 may be molded in sides 14, 16 to allow the user to grip dispenser 10 more easily. In certain embodiments, the corrugations 40 can be oriented forward on the dispenser body. Moreover, by locating a majority of the corrugations from longitudinally equal to or forward of the bar 18, it was found that user operation was superior during dispensing of the tape and cutting.

An upper surface of the tape dispenser 10 may further include a viewing passage 80 formed in the top wall 12. The viewing passage 80 can allow the user of the dispenser to observe the orientation of the tape within the dispenser during loading and operation.

The tape dispenser 10 can further include a finger receiving opening 90 formed in said top wall. The finger receiving opening 90 can improve the users' ability to manipulate the dispenser, particularly during the tape application and cutting steps. The finger receiving opening 90 can overly the bar 18. The finger receiving opening 90 can be generally commensurate in length and width with the bar 18.

The tape dispenser 10 can further include legs 101 and 103. Legs 101 and 103 can allow the dispenser to be rested in a vertical orientation.

Pressure pad 24 can be integrally molded with the walls 12, 14, 16 or be snap fitted into the interior of the front portion. Pressure pad 24 may, of course, be secured to the front portion of dispenser 10 in any other suitable manner, such as riveting, without departing from the scope of the present disclosure.

With reference now to FIG. 9, in operation, a tape free end FE is dispensed from the tape roll 18 by applying a pulling force. The tape can be dispensed in orientation FE1 during this initial unwinding. Position FE1 can be generally parallel to the axis upon which the tape core 19 is disposed. Once a sufficient length of tape is unwound, the tape free end FE can be twisted into position FE2 wherein at least a portion of the tape free end FE can reside in space 21. Position FE2 can be generally perpendicular to the axis of the tape core 19. Thereafter, the tape free end FE can be rotated through space 21 and over bar end 67 into position FE3 where it can rest on surface 20 of bar 18 in an orientation properly situated for application to a surface. Notch 17 provides improved access to the tape free end FE during the loading process. The arrows of FIG. 9 generally depict motion between these orientations.

The tape free end FE is brought into contact with surface 20 of bar 18 where it is retained until application of the tape to surface. Moreover, front portion of dispenser 10 can be oriented downwardly so that pressure pad 24 urges the tape free end FE into contact with a surface. The adhesive secures the tape free end FE to the surface as pressure is applied. Dispenser 10 is then moved rearwardly while pressure continues to be applied. This maintains contact between pressure pad 24 and the tape while allowing the tape to be dispensed from roll 18. The continuous pressure from pressure pad 24 smooths the tape out as it is dispensed, thereby substantially preventing the tape from sticking to itself and forming pockets that cannot be secured to the surface. When it is desired to cut the tape, the tape is held taut and dispenser 10 is rotated so that teeth of cutter blade 22 contact and cut the tape. The severed tape remains stuck to the surface and the tape that remains connected to the dispenser 10 drops back into engagement with bar 18 where it is retained until a user desires to apply a further length of tape to a surface.

A further advantage of the present tape dispenser is the inclusion of a rear bulge 101 which extends beyond the outline of a standard size roll of tape. Moreover, it has been found that bulge 101 can discourage a user from resting a palm of the hand on the roll of tape, which could otherwise impart an undesirable braking action during tape application. In this regard, a standard packaging tape roll may have a diameter of about 2½". Accordingly, the bulge 101 can have a radius from the hub center extending greater than about 1¼" to 1½".

As used herein, the terms about, generally and substantially are intended to encompass structural or numerical modifications which do not significantly affect the purpose of the element or number modified by such term. Furthermore, the use of ranges within this disclosure is intended to encompass the interchangeability of the various end points thereof.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A tape dispenser comprising a frame having a top wall and opposed side walls, said top wall connecting the opposed side walls; said side walls being separated rearwardly from said top wall such that an exterior surface of a roll of adhesive tape is exposed in a rearward and downward orientation, said side walls being flexible relative to each other to allow insertion of the roll of adhesive tape and attachment to said tape dispenser; a tape mount disposed on at least one interior surface of one of the side walls and being adapted to secure the roll of adhesive tape therebetween; a cutter blade disposed on a forward region of the frame and adapted to cut tape from the roll; a bar comprising a hollow semi-cylinder disposed on the interior surface of one side wall, said bar extending between greater than about 40% and less than about 90% of a distance between said opposed side walls; and wherein the bar has an upper surface receiving an adhesive side of said tape; a pressure pad mounted on the frame adjacent the cutter blade, the pressure pad having a bottom surface adapted to push tape from the roll of adhesive tape into contact with a surface to which the tape is being applied as the tape is dispensed.

2. The tape dispenser of claim 1 wherein the upper surface of said bar is crenulated.

3. The tape design of claim 1 wherein said bar includes at least one roller element.

4. The tape dispenser of claim 1 wherein said bar is stationary and extends between about 50% and about 75% of said distance between the opposed side walls.

5. The tape dispenser of claim 1 being comprised of a monolithic molded plastic body.

6. The tape dispenser of claim 1 wherein said bar includes a rounded end remote from engagement with the side wall.

7. The tape dispenser of claim 1 wherein said bar includes a plurality of monolithic reinforcing tabs on an interior surface.

8. The tape dispenser of claim 7 wherein said tabs are oriented perpendicular to a longitudinal axis of said bar.

9. A tape dispenser comprising a frame having a top wall and opposed side walls, said top wall connecting the opposed side walls; said side walls being separated by said top wall such that an exterior surface of a roll of adhesive tape is exposed in a rearward and downward orientation, said side walls being flexible relative to each other to allow insertion of the roll of adhesive tape and attachment to said tape dispenser; a tape mount disposed on at least one interior surface of one of the side walls and being adapted to secure the roll of adhesive tape therebetween; a cutter blade disposed on a forward region of the frame and adapted to cut tape from the roll; a bar disposed on the interior surface of one side wall, said bar extending between greater than about 40% and less than about 90% of a distance between said opposed side walls; and wherein the bar has an upper surface receiving an adhesive side of said tape; a pressure pad mounted on the frame adjacent the cutter blade, the pressure pad having a bottom surface adapted to push tape from the roll of adhesive tape into contact with a surface to which the tape is being applied as the tape is dispensed, and wherein the side wall opposite the bar includes a notch in an edge between said pressure pad and a foot.

10. The tape dispenser of claim 1 wherein said tape mount comprises a hub portion extending from each side wall.

11. The tape dispenser of claim 1 further comprising a viewing passage formed in said top wall.

12. The tape dispenser of claim 11 further comprising a finger receiving opening formed in said top wall.

13. The tape dispenser of claim 12 wherein said finger receiving opening overlies said bar.

14. The tape dispenser of claim 13 wherein said finger receiving opening is generally commensurate in length and width to said bar.

15. A tape dispenser comprising a frame having a top wall and opposed side walls, said top wall connecting the opposed side walls; a tape mount disposed on an interior surface of each of the side walls and being adapted to secure a roll of tape therebetween; a cutter blade disposed on a forward region of the frame and adapted to cut tape from the roll; a bar disposed on the interior surface of one side wall, said bar comprising a hollow semi-cylinder extending between greater than 40% and less than 90% of a distance between said opposed side walls to provide a space between an end of the bar and one side wall.

16. The tape dispenser of claim 15 further comprising a plurality of corrugations on an outer surface of each of the side walls, at least a majority of said corrugations disposed longitudinally forward of a location of said bar.

* * * * *